Aug. 2, 1949.    P. E. MERCIER    2,477,637
AIRCRAFT
Filed Nov. 14, 1941    6 Sheets-Sheet 1

INVENTOR.
*Pierre Ernest Mercier*
BY *Haseltine, Lake & Co.*
ATTORNEYS

Aug. 2, 1949.

P. E. MERCIER

2,477,637

AIRCRAFT

Filed Nov. 14, 1941

INVENTOR.
Pierre Ernest Mercier
BY Haseltine, Lake & Co.
ATTORNEYS

Aug. 2, 1949.  P. E. MERCIER  2,477,637
AIRCRAFT
Filed Nov. 14, 1941  6 Sheets-Sheet 4

INVENTOR.
Pierre Ernest Mercier
BY Haseltine, Lake & Co.
ATTORNEYS

Aug. 2, 1949.  P. E. MERCIER  2,477,637
AIRCRAFT
Filed Nov. 14, 1941  6 Sheets-Sheet 5

INVENTOR.
Pierre Ernest Mercier
BY Haseltine, Lake & Co.
ATTORNEYS

Aug. 2, 1949.    P. E. MERCIER    2,477,637
AIRCRAFT

Filed Nov. 14, 1941    6 Sheets-Sheet 6

INVENTOR.
Pierre Ernest Mercier
BY Haseltine, Lake & Co.
ATTORNEYS

Patented Aug. 2, 1949

2,477,637

UNITED STATES PATENT OFFICE 2,477,637

AIRCRAFT

Pierre Ernest Mercier, New York, N. Y.

Application November 14, 1941, Serial No. 419,152

3 Claims. (Cl. 244—15)

This invention relates to improvements in aircraft and more particularly to means for increasing the range of controlled equilibrium, stability, buoyancy, lifting power and momentum of the aircraft.

One of the objects of the present invention is to provide a simple, efficient and inexpensive embodiment of aircraft designed to afford better means of control during low-speed flights as well as during conditions of adverse winds and other sources of external disturbances.

A further object of this invention is to provide more effective compensation that may be rendered necessary in connection with the control of all factors with which the center of gravity and the center of pressure of aircraft are concerned.

To this end my invention provides sustained lessening of drag of the boundary layer in the vicinity of the fuselage and wing structure especially and is calculated to impart to the wings superlifting power, to the fuselage increased balance, to the power plant and accessories better cooling power, and to the aircraft proper increased propulsion.

A further object of this invention is to provide for delivering atmospheric air into the wings and fuselage of aircraft and directing same at the rear of the machine. Lines of flow of such air at various levels along the length of the fuselage are provided beginning at a point at the rear of the greatest cross sectional area of the fuselage and continuing in a path which leads to a rear propulsive nozzle or other instrumentality. In this way inordinate drag may be reduced, and a more effective cooling means employed for the engine or engine accessories.

Ordinarily the drag of a streamlined body is increased when air intakes or equivalent members are arranged at certain points of its exterior surface, which increase of drag is due both to the energy dissipated in the conduit through which flows the air taken in, and to the disturbance introduced by said intake of air in the general flow. If instead of taking from the surrounding air the energy needed to produce the circulation, this energy is introduced at a point of its path in the streamlined body the drag of the aggregate can not be affected by the conduit. If, in short, an excess supply of energy relative to the loss of load must be overcome in the branch circulation is delivered to the air of the branch circulation, the drag of the aggregate may be reduced to its initial value.

In accordance with the present invention I introduce a line of flow of outside air from the outer surface of the fuselage and cause it to circulate in the interior thereof so as to contribute a cooling agency and then it is swallowed up by the whirlwind of a forced draft of air created in the rear of the machine and by which it is ejected from the aircraft. The air thus introduced is regenerated and before ultimate discharge may be evacuated at such points that both at the inlet as well as outlet the general flow is improved, the general effect being to impart to such air currents a velocity of ultimate ejection substantially equal to or greater than the velocity of flight.

A salient feature of my present improvement is providing certain expedients adapted to build up superlifting power for the wing structure of the aircraft under conditions that assure maintaining at all times coordinated stability and buoyancy of the fuselage body or nacelle as the case may be. For this purpose communication is had between wings and the interior of the fuselage or nacelle and translation of air from this fuselage interior is had with a rear propulsive unit.

Accordingly I introduce air, taken from the outside atmosphere, about the rear part of the wing immediately adjacent to the fuselage in a manner effective to enhance levitation of the fuselage. I attain this by causing a blower or mechanical means to create a forced draft of air at the rear of the machine thereby creating a suction which establishes a line of flow of air peripherally of the fuselage and perimetrically of the wings into the interior of the fuselage coaxially thereof towards the rear where, under accelerated velocity, same is evacuated to the atmosphere after thrusting the streamlined aircraft structure forwardly in cooperation with the power plant of the aircraft. As a result of this practice the wings secure superlifting power and the fuselage skims along with a great reduction in surface friction.

In designing the parts which are to contribute to a more efficient and economical distribution of air forces for maneuvering the flight of the aircraft equipped with my invention, under adverse as well as ordinary weather conditions I locate a powerful speed-motivated and manually controlled air chamber interiorly of the fuselage with a mouth opening out in the bottom thereof and with an outlet directing air into a rear propulsive nozzle, and here I locate a powerful blower fan for sucking the air admitted through this chamber into the rear propulsive unit and forcibly ejecting same. To further provide buoyant coordination between the wing-influenced parts of the fuselage and the parts reacted upon by gravity to the rear thereof I may provide a concentric column of induced air sucked in from the atmosphere at the extreme outer rear end of the fuselage and charge into this column of air the fan-impelled ejected air initially introduced from outside the body of the fuselage in the zone of the wing structure.

Due to the circumstance that there are provided various coordinated instrumentalities for harnessing dynamic air pressures to the pull of the aircraft induced by the power plant, intended for alternate, optional or collective operation, it becomes necessary to provide selective control for same. In this connection I provide one such control in the form of a tiltable flap at the trailing end of the wing structure in order to sustain same during slow-speed flight. When this flap is turned down it causes a suction slot to open situated on top of the wing structure, thus creating a pneumatic line of pull through the interior of the wing structure to a stratum under the fuselage and reducing drag of the boundary layer at the same time.

Another control is provided for the intake of atmospheric air at the bottom of the fuselage at the mouth of the mentioned air chamber by means of manually or electrically controlled dampers or vanes designed to progressively throttle such entry space for air effectively. I provide also pneumatically controlled means for opening and closing intake ports in other parts of the outer surface of the fuselage. The effect of these controls is to give to the operator of the machine selective means to instantly shift aerodynamic forces where it will more powerfully contribute to sustain normal flight of the aircraft.

With the above and other objects in view my invention consists in the combination, arrangement and details of construction disclosed in the drawings and then more particularly pointed out in the appended claims.

In the drawings wherein similar reference characters designate similar parts throughout the respective views.

In the drawings, which are merely illustrative of my invention, I disclose aerodynamic means for improving the flight of an aircraft. The propeller fairing 1 of propeller 2 is carried by the nose of the engine 3, under which is the air intake 4 for supplying the motor or its compressor, which is extended by means of the pipe 5. The lower profile of the fuselage is shown at 6. Two pipes 7 and 8 connect the engine 3 (assumed to be liquid cooled) to a radiator 15 arranged in the rear of the fuselage. The wing is shown in dotted lines at 9 which comprises a principal box 10 and a hollow trailing edge 11 which communicates with the outside by means of slots such as 12.

I provide an air duct or chamber for diagonal disposition interiorly of the fuselage, which is designated 13, which has a mouth opening out of the bottom surface of the fuselage in which are located movable dampers or vanes 14. Located operatively in said air chamber is the water-cooled radiator 15 of approved design through which air currents sucked into this air chamber pass to emerge out of the outlet end 16 of the chamber that empties concentrically and interiorly in said fuselage to deliver air towards the rear propulsive nozzle. It will be seen that pipes 7 and 8 are connected to this radiator and extend through an oblique partition 17, indicated diagrammatically and designed to isolate the rear compartment 18 from the rest of the fuselage.

Figure 3:
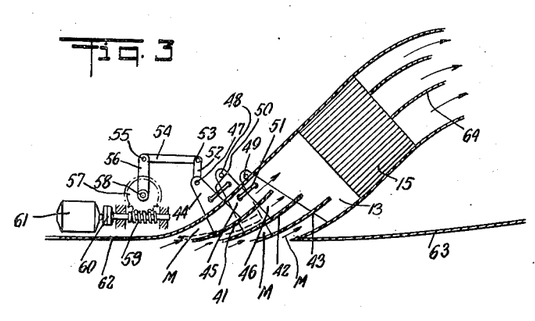
Figure 3 is a fragmentary view, in section, showing, on a larger scale, an air chamber disclosed in Figure 1, Figures 4 and 5 are partial vertical sections of a wing having in its rear part a superlifting air suction flap made in accordance with the principle of my invention.
Figure 10:
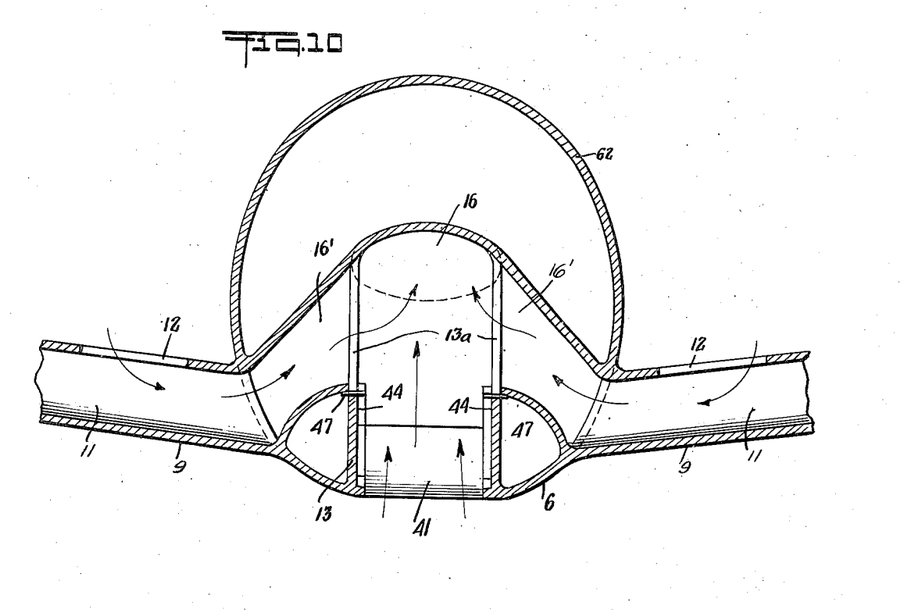
Figure 10 is a cross section taken on line 10—10 of Figure 1 looking in the direction of the arrow.
Figure 11:
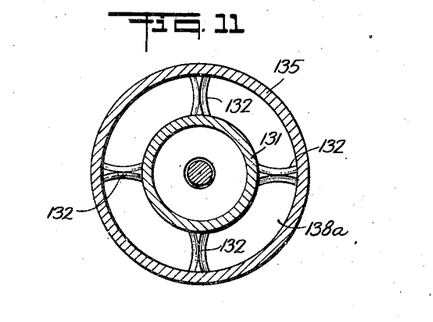
Figure 11 is a section taken on line 11—11 of Figure 9 looking in the direction of the arrows.

Flanking air chamber 13 and communicating with its interior by slots 13a in a plane at right angles are the oppositely diagonally disposed conduits 16' which directly communicate with the hollow interiors 11 of the wings 9, as shown in Figure 10. In Figure 3 the details concerned with actuating the movable dampers or vanes 14 are disclosed.

A mechanism for manipulating the movable vanes to control the quantity of air introduced into the chamber 13 from the lower side of the fuselage is shown in Fig. 3. As shown in this figure, three curved vanes 41, 42 and 43 are provided and these extend across the mouth of the air chamber 13, one in back of the other. They are supported at the bottom ends by sets of carrier arms 44, 45 and 46 successively pivotally suspended upon fixed pins 47, 48 and 49. Such an arrangement adapts the vanes to swing from one position, shown in Figure 3 where they open the air passages M intervening between them to a closed position indicated in Figure 3 by dotted lines. These vanes are scoop-shaped. It will be seen that opposing walls of the mouth of this air chamber, at their lowermost extremities curve in the same direction, conforming to the curvature of the vanes.

Links 50 and 51 are pivotally attached so as to interconnect the carrier arms 44, 45 and 46 so all these arms and the vanes which they carry will move in unison. Any desirable mechanism can be employed to actuate these carrier arms. An arm 52 is pivoted at 53 to link 54 and serves as a crank for pivot pin 47 to turn carrier arm 44 and therefore all the carrier arms at the same time. Link 54 is pivotally secured at 55 to a drive crank 56 secured upon a fixed shaft 58 on which is a worm wheel 57 meshing with a worm 59 on a shaft which at 60 is coupled to an electric motor 61.

Figure 1:
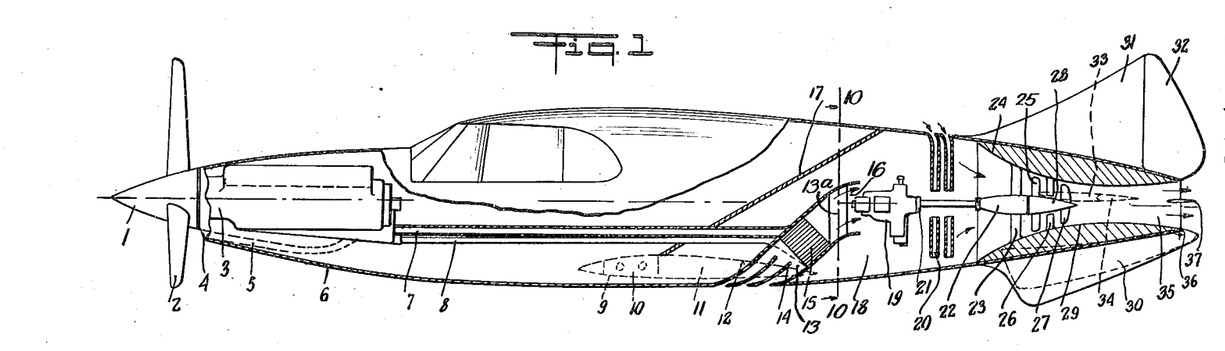
Figure 1 shows in vertical section my invention applied to a conventional aircraft equipped with an engine mounted in the nose of the fuselage and driving a tractor propeller.
Figure 2:
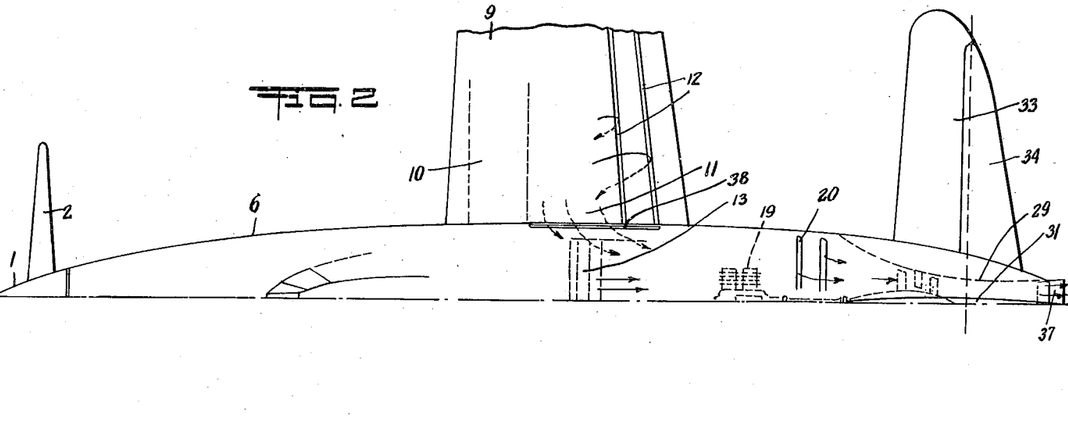
Figure 2 is a plan view of Figure 1, showing parts on one side of the central longitudinal axis.

In Figure 1 it will be seen how the outlet end 16 of air chamber 13 slopes in the direction of the propulsive nozzle at the rear of the machine, concentrically of the fuselage. I locate fixedly an auxiliary engine 19 part of which projects into this outlet end 16 of the air chamber. The engine carries a shaft 21 transmitting power to a reducing gearing the streamlined casing of which is shown at 22 supported by diametrically opposite arms 23 carried by the nozzle 29. This nozzle 29 has a bore which flares outwardly as at 35 to communicate with the outer atmosphere, and also flares outwardly from its restricted throat portion in the opposite direction towards the interior of the fuselage as at 24, the arms 23 being arranged in this last named flaring position.

Opening out from the top as well as sides of the fuselage in advance of the nozzle are elongated air intake slots 20 being disposed at right angles to the coaxial line of flow of the air emerging from air chamber 13 at 16 en route to and through said nozzle. At the rear and acting as a continuation of the streamlined gear case 22 is a tapered spinner body 28 carrying sets of fan blades 25 and 27 which are driven through the gearing mounted within the casing 22. The fan blades 25 and 27 cooperate with stationary blades 26 mounted on the wall of nozzle 29.

Figure 7:
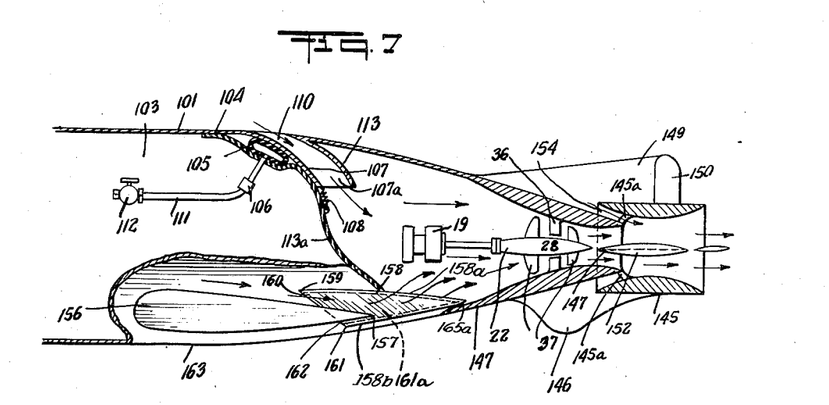
Figure 7 is an enlarged vertical sectional view of part of an aircraft disclosing certain auxiliary aerodynamic instrumentalities.
Figure 14:
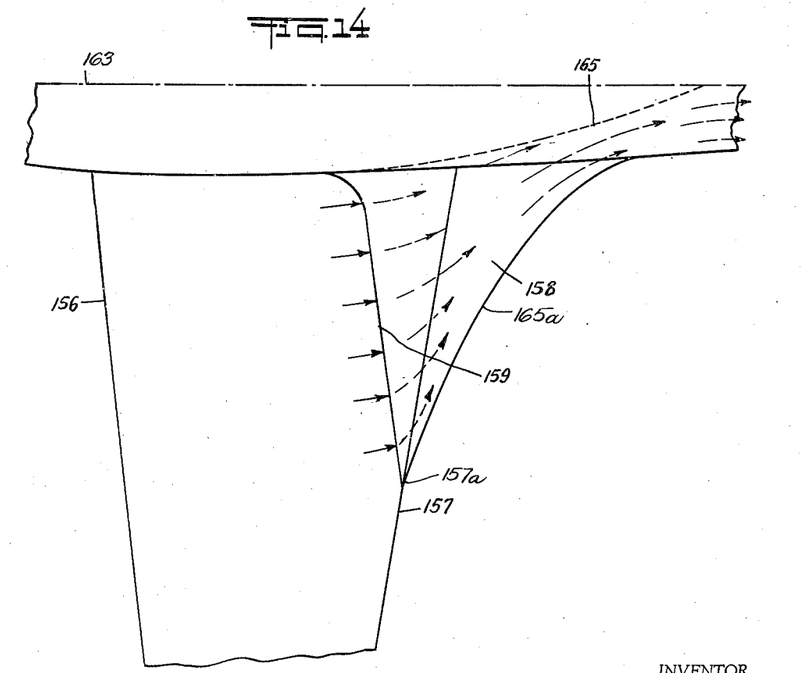
Figure 14 is a top plan view, partly broken away of a part of an aircraft revealed at the base of one of its wings.

The matter of establishing a line of flow of atmospheric air into the wings of aircraft and thence into the fuselage to utilize its aerodynamic power for propulsion and lifting and stabilizing purposes is very important. Referring to Figures 7, 10 and 14 I disclose such an arrangement, that of Fig. 7 being in somewhat modified form.

The point of juncture of the wings with the fuselage of an aircraft is a vital location for introducing stabilizing factors. Accordingly I provide means for entraining air at such point. The wing 9 is formed with air intake ports 12 admitting atmospheric air into the hollow interior portion 11, whence the air passes laterally into the fuselage and is drawn to the rear of the propulsive nozzle 29 under the suction of the fan blades 25 and 27 (Fig. 1).

In Figs. 7 and 14 there are shown details of a sheath 158 extending gusset-like over the trailing edge of the wing and terminating along one side adjacent the surface of the fuselage. The region where the sheath is positioned is known as a zone where harmful turbulence of the boundary layer of air arises. The sheath is therefore given a special disposition and shape. The sheath is made up of two generally triangular sheets 158a and 158b joined to one another along their common curvilinear rearward edge and flaring upwardly away from one another along their inner edges where they are joined to the fuselage so as to permit them to extend forwardly in enclosing relation to the adjacent lateral surfaces of the trailing edge portion of the wing structure. At its rearward curvilinear edge the sheath extends from a point 157a on the trailing edge 157 of the wing 156 located a suitable distance from the fuselage diagonally across to the adjacent lateral surface of the fuselage 163 at a point thereon located to the rear of the junction of the trailing edge with the fuselage. As shown more particularly in Fig. 14, the sheath at its forward edge 159 extends inwardly from the point 157a diagonally toward the body of the fuselage across the intervening rearward portion of the lateral surfaces of the wing adjacent the trailing edge. As shown more clearly in Fig. 7, at its forward edge 159 the sheath is spaced from the adjacent upper and lower surfaces of the wing so as to provide slots 160 and 162 through which air passing along the upper and lower surfaces of the wing in the region embraced by the sheath may be led into the hollow interior space defined within the sheath. Because of the rearwardly curved shape of the sheath and the joinder of the two sides thereof along the line 165a, the air entering the hollow space is guided laterally toward the fuselage and also in a direction leading toward the rear thereof.

The sheath is closed along the inner wall where it joins the fuselage except in the region to the rear of the partition 113a which divides the habitable part of the fuselage from the space into which air is drawn under the action of the fan or turbine and from which it is ejected through the propulsive nozzle. In Fig. 14 the partition 165 is shown as flaring laterally inwardly of the fuselage and forming the inner wall of the sheath 158. This inner wall 165 also defines a passage leading in the direction of the propulsive nozzle.

It will be particularly noted that the forward edge 161 of the bottom wall 158b of the sheath 158 is disposed somewhat rearwardly of the forward edge 159 of the upper wall 158a. Between the edge 161 of the bottom wall of the sheath and the trailing edge 157 of the wing there is a restricted inwardly flaring passageway 162 which extends the length of that portion of the sheath which embraces the trailing edge of the wing. This passageway may be considerably more restricted than the passageway into the sheath from above the wing surface because the tendency to turbulence in the boundary layer is always much greater in the region above the wing surface adjacent the fuselage or the nacelle, as the case may be, than it is immediately below the wing surface, and, therefore, a greater volume of air needs to be drawn into the sheath through the slot 160 if the turbulence is to be suppressed.

This sheath or wing attachment serves the function to draw the boundary layer into the part of the wing adjacent to the fuselage, and by its position, is adapted to provide a space between the exterior surface of the wing and the anterior edge of the sheath by which this is effected. The boundary layer ususally is greater on the upper surface than on the lower surface.

Figure 9:
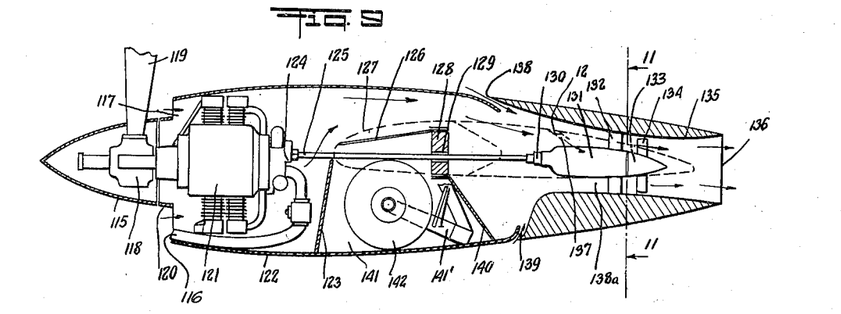
Figure 9 is a longitudinal sectional view of an engine nacelle within whose confines are located various parts exemplifying the principle of my invention.

So far the assembly of parts intended to draw atmospheric air into the body of the streamlined aircraft structure have been shown mounted in the fuselage part thereof. But it is also contemplated that flow-inducing means and means creating a forced draft of air may be mounted in the nacelle of the aircraft, symmetrically adapted for functioning. This is shown in Figure 9.

In multi-engined aircraft economy of space is most essential. This is attained in the construction shown in Figure 9 where the motor nacelle fairing is disclosed in conjunction with a direct cooled radial engine. The spinner of the propeller is shown at 115. The air intake for the engine is shown at 116. At 117 is disclosed the inlet passage for the cooling air of the engine, which is of an annular shape. 118 designates the propeller hub. A propeller blade is shown at 119. The fixed fairing which follows the spinner is shown at 120, the engine at 121.

The fairing of the nacelle, properly speaking, is shown at 122. The lower part of the fire wall is shown at 123. The engine delivers its power at 124 to a transmission shaft 125, which passes through the upper portion of the fire wall at 126, which latter is inclined toward the rear. The outline of the profile of the wing carrying the nacelle is shown in broken line at 127. The wing is provided with a principal spar 128 the web of which is pierced at 129 to allow the transmission shaft 125 to pass through. The latter drives by means of a coupling 130 the gearing 131, which is supported by the diametrically opposite arms 132 arranged in the intermediate portion of the internal bore 138a of the propulsive nozzle 135. The streamlined turbine hub 133, associated with gearing 131 and to the rear thereof is shown provided with the fan vanes or blades 134. This turbine partially extends into the outwardly flaring end of the bore of the nozzle 135.

At the base of the nozzle, at a point upon the peripheral surface of the nacelle to the rear of its greatest cross-sectional area, are formed air-intake or suction slots. Those on the upper surface are designated 138 and those on the lower surface are designated 139. Slots 138 incline so as to direct outside air directly into the bore of the nozzle, while slots 139 direct outside air upwardly from the bottom of the nacelle into the outwardly flaring entering end of the nozzle bore. Similarly suction slots are formed at 137 in the hollow wing 127.

In the nacelle is also accommodated the retractable landing gear, in a compartment 141 formed between wall or partition 123 and partition 140. In Figure 9 the gear is shown in retracted position so that its wheel 142 and mounting 141' are completely hidden from view.

It is of prime importance to provide the wing structure of an aircraft equipped with my flow-control means for leading in outside air with auxiliary or supplemental means for sucking outside air into the hollow interior of the fuselage along the trailing edge of the wing where tiltable flaps are provided upon the wings. In the latter case the air-admission structure shown in Figs. 7 and 14 cannot be employed since this trailing edge of the wing is encased in a rigid sheath. This is particularly true for flights at low speeds, where aerodynamic forces should be concentrated to sustain the wing in flight.

For this purpose I provide novel flaps which, when turned down cause a suction slot to open which is situated on the top of the wing and near the hinge of said flaps. Means are provided for insuring the compensation of the aerodynamic forces by the surrounding air on said flaps, while they are lowered. These means include the employment of a flexible joint of sheet metal, rubber or its equivalent, fixed respectively by one of its edges to the rear edge of the lower surface of the wing, and by the other to the front edge of the lower surface and of the flap opposite. Said flexible joint has the form of a gutter more or less closed according to the position of the flap relative to the wing.

Figure 6:
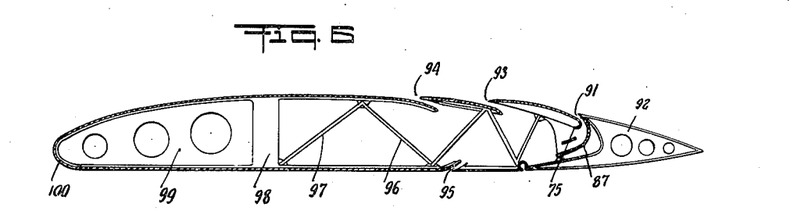
Figure 6 is a diagrammatic section on a smaller scale of a wing provided with a tiltable valvular flap hereinafter described.

The main body portion of the wing, which is provided with the superlifting air suction flap is also provided with auxiliary suction slots 93, 94 and 95 which add their effect to the variable slot 91 about to be described. Figure 6 discloses this arrangement of parts, where it will also be seen that rip elements of the trailing edge of the wing are shown at 96 and 97. This wing is also provided with a principal spar 98 and with leading edge ribs having perforated sides such as 99.

Figure 4:
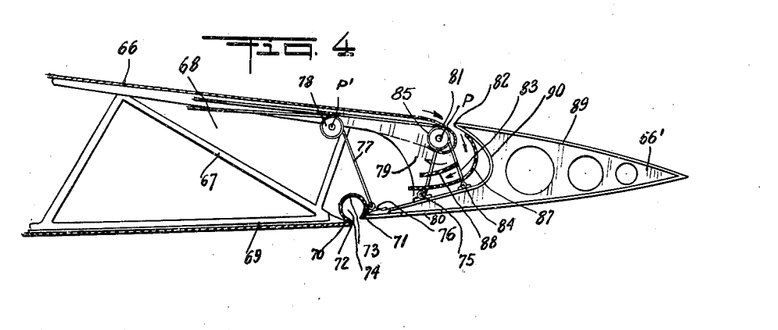
Figure 5:
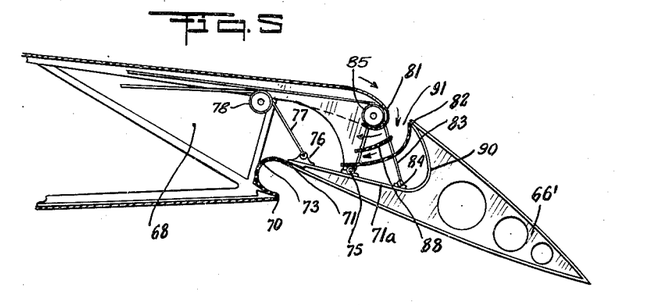

Referring now to Figures 4 and 5, 66 designates the fixed portion of the wing, which is of hollow construction. A flap 66' is associated with the wing at its rearward edge. This flap is supported in such relation to the main body of the wing 66 as normally to provide a gap 91 which varies in cross-section according to the position of the flap. The flap is of such cross-sectional configuration as to continue the streamline contour of the wing structure. A rib element 67 is located in the interior of the wing which forms a compartment 68. The lower surface of the wing is designated 69 and terminates opposite the flap in a tapering edge 70. Similarly a confronting surface of the hinged flap 66' on its lower surface is formed with a cooperating tapering edge 71 which forms the terminus of an inwardly and upwardly inclining surface 71a forming a transversely extending front wall on the flap. This front wall therefore converges to the tapering edge 71, while it is rearwardly bowed to provide the concavo-convex portion 90 that completely closes the front end of the flap 66'. It will be observed that the upper surface of flap 66' is shorter in length than the lower surface, both surfaces coming together in a taper. The inner end of flap 66' is virtually cup-shaped.

The arrangement is further such that upper surface 66 of the wing curves around at 81 to form a head extending transversely thereof. Arms 79 are found upon the upper surface of wing 66 which extend downwardly and terminate near the lower part of the wing at which point a pivot rod 75 is spanned across into these arms, upon which is journaled operably the front wall 71a of flap 66' adjacent to edge 71. It will be observed that the pivot rod 75 is located fixedly at 75' somewhat in advance of the tapering edge 70 of the wing, and that the front lower portion of tiltable flap 66' projects between pivot rod 75 and edge 70, and that when flap 66' is fully closed as shown in Figure 4, tapering edges 70, 71 are spaced apart slightly. When the flap is tilted to widen the gap and suction slot 91, as shown in Figure 5 then edges 70 and 71 of the main body portion of the wing and of the flap respectively are separated still farther apart. Hence it is necessary to provide a flexible joint between edges 70 and 71 in order to close this front portion of the wing and keep it closed in any angular position of flap 66'. I accomplish this by means of the flexible body 73 one end of which is attached to edge 70 of the wing proper and the other end of which is attached to a trapezoidal metal member fixed on its nose at 76 upon tapering edge 71 of flap 66'.

Operatively secured endwise to and between arms 79 are two arcuate metal deflector bodies, 87 and 88 respectively, of which deflector 87 is flexible, only a minor area being secured to arms 79, its major body freely projecting beyond and upwardly of these arms where it is arched or bowed inwardly towards the bowed portion 90 of the front wall of flap 66'. The deflector bodies 87 and 88 provide separate passageways which open out by means of slot 91 to the atmosphere. A pulley 85 is operatively journaled on pintle P in head 81 over which is trained a cable 83, which projects through an opening not shown in deflector 87 and is secured to the bowed wall portion 90. Another pulley 78 is operatively journaled upon a pintle P' over which is trained a cable 77, which extends downwardly from the pulley and is secured to the lug 76 secured over edge 71 of the flap 66'. These cables extend into the cabin within ready reach of the operator or pilot who will manipulate same in a manner to be explained.

Figure 8:
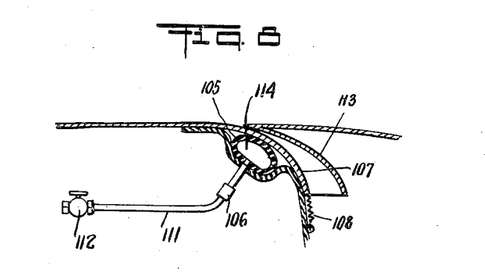
Figure 8 shows in section a suction slot with means for closing the same.

In Figure 8 is disclosed an optional form of my invention which carries forward the principles already described for the purpose of indicating still further efficiencies. Means are provided for controlling the intake of atmospheric air into the fuselage or other streamlined body of the aircraft, as well as for adding a column of air in line with the axis of the fuselage or streamlined body at the extreme outer discharge end of the nozzle.

Figure 12:
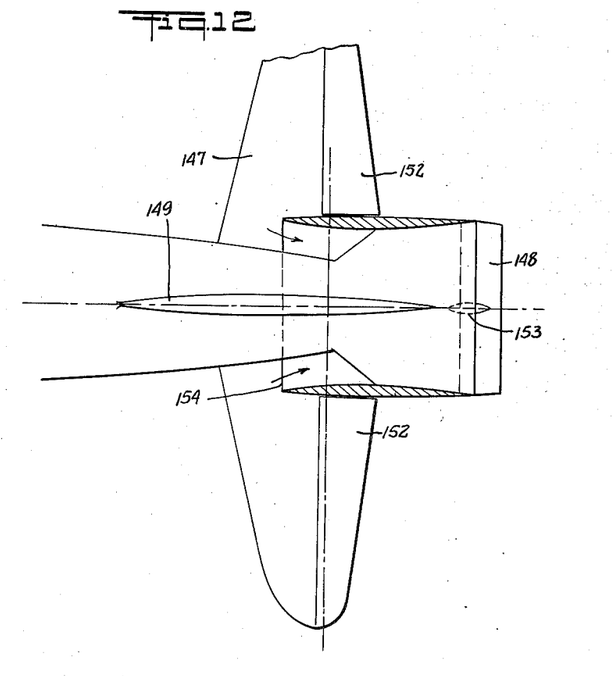
Figure 12 is a top plan view, partly in section, of an auxiliary suction device associated with the rear propulsive unit.
Figure 13:
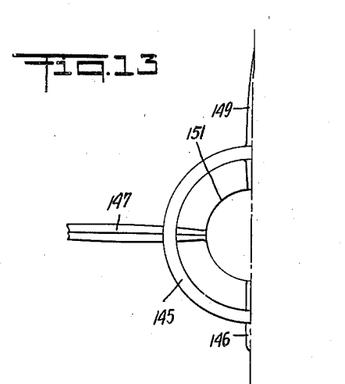
Figure 13 is an end view, on one side of a medial line of Figure 11.

Referring to Figures 7, 12 and 13 there is disclosed a coaxial collar 145 at the tail end of the aircraft for increasing the efficiency of the air flow and stability of the machine in general. It will be seen that such ring has its inner end spaced concentrically around the conical terminal portion S of the nozzle 29, being secured thereto by means of radial struts 145a or the like. The major length of the collar 145 projects rearwardly of the conical nozzle terminal S, the diameter of its bore here being greater than the discharge end of the nozzle bore. It follows that an annular suction passage 154 is formed around this end of the nozzle 29. The lower vertical surface member 146, the upper fin 149, and the horizontal rudder member 147 also serve to support his collar 145. The fin 149 is shown provided with a mobile flap or rudder 150 and the horizontal member 147 with an elevator 152.

A pivoted trimming tab or balance is shown at 148 (Fig. 12). It acts on the combined flow of air passing through annular member 145 under acceleration by the turbine or any equivalent member mounted in the bore of the nozzle 29 in advance of the diverging portion thereof. Said tab or balance is provided with a balancing counterweight 153 to prevent or overcome oscillations.

Referring further to Figure 7 it will be seen that provision is made to introduce atmospheric air into the streamlined body from the upper surface of this body and to control the flow of air therethrough. A suction opening or slot 110 is formed upon the upper surface of the fuselage 101 and is associated with a downwardly extending and inclining baffle plate 113, which, with the upper portion 104 of partition wall 113a, also inclining in the same direction as baffle plate 113, forms an air passageway 107a that conducts air by suction downwardly into the interior 103 of fuselage 103 in the direction of the rear nozzle. A collapsible air sack 105 is fixedly caused to overlie partition portion 104 having attached thereto a pipe 106 which projects into partition portion 104. Pipe 106 has an extension 111 which is attached to a pressure fitting 112 controlled by a valve. Stretched across the top face of the air sack 105 is a flexible or elastic diaphragm 107, secured at the point of juncture of partition end 104 with upper surface 101 of the streamlined body. The other end of this diaphragm is secured to a contractile coiled spring 109 secured to partition 113a. The latter partition divides the interior of the fuselage into two sections, the rear section receiving the air supply through slot 110 and through the discharge side of sheath 158 or through either.

It will be seen that the engine 19 is secured in position in the direct path of flow of the air through suction slot 110, and that its shaft carries the multiplication gear 22 and the fan-operating turbine 28, already described, the fan blades 37 being located midway in the bore 144 of the rear propulsive nozzle.

I will now describe the mode of operation of the present invention.

In Figures 1, 2, 3 and 9 it will be seen that as the aircraft is in flight and engine or power plant 19 is in operation, that a forced draft of air will be created and produce a vortex or whirlwind in the bore of the rear propulsive nozzle 29. This will create a powerful suction in front of the fan interiorly of the fuselage which causes pressure to be added to the currents of air flowing into the fuselage, through suction slots 20 and air chamber 13 respectively, thereby augmenting their momentum considerably. Outside air is thus caused to flow from different levels of the fuselage towards the rear of the same, undergoing acceleration in the nozzle so as to be forcibly ejected out of the nozzle into the atmosphere, impacting the latter and imparting a sharp forward urge to the machine in addition to the pull of the main power plant 3 at the front of the aircraft. In this way head resistance is reduced and its lifting properties enhanced in accordance with the flight conditions at high or low speed.

The pilot may operate the electric motor 61 (see Figure 3) for the purpose of varying the suction of outside air from the bottom of the fuselage 6 through the air chamber 13 or 40. The motor 61 may be set to make a limited number of rotations or limited rotation may be produced by any pneumatic or hydraulic means not shown. As the motor turns worm 59 turns worm wheel 57 which rocks crank 56, which impels 54 to move, which rocks lever arm 52 thereby tilting or rocking the carrier arm 44 about its pivot 47. Thereupon the carrier arm, by means of link 50 rocks carrier arm 45, which operates link 51 to rock carrier arm 46, so all carrier arms swing at the same time, causing the vanes or dampers 41, 42 and 43 to move to the left in the mouth of the air chamber. They are adjustable by degrees so as to narrow the passageways M between them or close them.

When the vanes are open, air will rush into air passageways M upwardly into the air chamber passing through radiator 15, hence cooling it, passing also through the upper passageways 65 made by the baffle plates 64 and emerging from the chamber end 16 (Figure 1) and completely enveloping engine 19, thus cooling it. As radiator 15 becomes cool it effects a heat transfer from the liquid cooled pipes 7 and 8 that connect with the front propeller operating power plant 3. While this is taking place atmospheric air is being sucked into the slots 12 of the wings 10, 11 (see Figures 2 and 10) and thence through air conduits 16' into the air chamber 13, contributing a stabilizing factor to the wings. Means for closing slots 12 can be employed similar to what is disclosed in Figure 7 in connection with slots 110.

The stability, of course, of the aircraft is insured by the lower vertical surface 30 and an upper vertical surface 31 provided with the movable flap 32. The stability and maneuverability in depth are obtained by the horizontal empennage surface 33 provided in conjunction with the flap 34.

It is obvious that the blower fan or turbine 22 may be operated directly by power plant 3, in which case the latter would still be cooled by means of the flow and return pipes 7 and 8 which communicate with the radiator 15. For slow flights in general the auxiliary engine 19 will be used to insure the correct cooling of the engine and to increase the lift of the wings. At high speed the maximum lift drag ratio may be had and controlled by means of an appropriate balance between the suction of air in the wings and at the level of the slots 20 or the like.

In order to insure the maximum efficiency in the suction and blowing members driven by the auxiliary motor, the invention provides for the adjustment of the control members of the suction flows both at the level of the wings and at that of the fuselage to the value of the partial vacuum which obtains in the interior compartment 18 with respect to the outside.

Where suction and blower means are located in the nacelle, as is shown in Figure 9, the operation is as follows. The blower fan blades 134 are driven from the remote power plant or engine 121 of the nacelle through transmission shaft 125 and gearing 131. Outside air is admitted through slots 12 into the hollow wings. Outside air will also flow by suction into upper suction slots 138 and lower suction slots 139 into the interior of the nacelle so as to flow into the bore of the propulsive nozzle 135 whose extreme discharge end is designated 136. The blast of atmospheric air created in this nozzle in a rearward direction sucks the inflowing air through and out of the nozzle to the atmosphere at greatly increased velocity which urges the aircraft forwardly at greater speed than would be the case were the propulsive nozzle not present. It should be noted that the blower fan will also exert a rearward pull upon the currents of atmospheric air that enter the intake passage 117 at the front of the nacelle which have to make a long traverse to reach the propulsive nozzle 135. Such air will be drawn into the nozzle along with the air entering into suction slots 138. It will thus be seen that the blower vanes may be driven by the principal engine or engines or at a distance from the same by means of transmissions.

The means provided for controlling the section of the suction slots in accordance with high speed or low speed flight will now be explained. Reference will now be made to Figures 7 and 8. Here the suction slot 110 is located on the rear walls of the fuselage and provided with a system of throttles controlled by fluid under pressure. In Figure 7 the slot is shown open. Air is sucked into the interior of the fuselage by operation of the fan blades 37 through suction slot 110, air passageway 107a, and envelops motor 19 to cool it, thence being drawn violently into and through the bore 144 of the nozzle. This air passageway has the form of a diverging curvilinear nozzle, which, for one and the same velocity of suction at the outside level has the advantage of reducing the load losses due to turbulence in the interior of the wing.

When it is necessary to close suction slot 110 this may be effected by opening the valve of fitting 112, thereby causing air under pressure to flow through pipe 111 into the collapsible air sack 105 which has a tendency to cause this sack to bloat or distend as shown in Figure 8 so that the sack puffs up and presses the elastic diaphragm 107 outwardly, pressing it against the tension of spring 108 forcibly against the baffle plate 113, thereby causing it to bulge across suction slot 110 to close the same. By stopping the flow of compressed air into the pipe 111 the bladder or air sac 105 is deflated so its collapses, which act causes spring 108 to contract again so as to pull the diaphragm downwardly to make it assume the position shown in Figure 7, so the suction slot 110 can open again.

In order to increase the efficiency of the tail surfaces the flow is improved since it is possible to combine with the rear propulsive nozzle the feature of an air concentrator taking the form of a collar 145 disclosed in Figures 7, 12 and 13 respectively. Here it will be seen that the onrush of air from out of the interior of the fuselage into and out of the nozzle 144 is accelerated by the creation of a forced draft of air by the blower fan 37, operated either by a local or remote engine, which has the effect to drive out violently such air into the atmosphere. However, where collar 145 is used the vortex created in the nozzle emerges into such collar and is met by a sudden powerful column of atmospheric air forcibly drawn in through the annular passage 154. The result is a violent precipitation and mixture of the blower fan impelled air currents and the column of air injected through passage 154, both flowing coaxially into collar 145 and expanding therein and forcing out of the collar a stream or air which impacts the atmosphere under heavy pressure and which at the same time keeps the rear tail surface of the aircraft on an even keel by centralizing the aerodynamic forces. Thus the layers of air following the outer terminal configuration of the fuselage or engine nacelle will be driven and accelerated in movement in its path of ejection.

The imposition of aerodynamic forces at the juncture of the aircraft wings and the fuselage will now be described. Reference being made to Figures 7 and 14.

In the course of flight of the aircraft atmospheric air is sucked in along the edge 159 of the sheath 158, as shown by the arrows, and flows in one layer into the air channel 160 and in another layer into air channel 161, thence flowing into the hollow space within the sheath, whence it emerges laterally out of the sheath into the interior of the fuselage as shown in Figure 7. A considerable volume of air will thus be drawn into the sheath which thus encases the trailing edge of the wing and has the effect of drawing the boundary layer into the part of the wing in close proximity to the fuselage or to the engine nacelle, as the case may be.

The operation of the means for controlling the flow of the air drawn into the rear of the wing structure will now be explained. Superlifting flaps are provided here which by means of their lowered or normal position control all or part of the flow of air drawn in on the upper side of the wing near their articulation. Reference being made to Figures 4 and 5, when the flap 66' is closed as shown in Figure 4 the suction slot 91 has the form of a narrow slit so a restricted air flow is allowed for the interior of the hollow wing. The cup shaped front wall 90 of the flap has flexed the baffle plate 87 slightly and has ridden over its terminal to be bridged partially across the mouth of suction slot 91, closing it to this extent. The air flows in two currents shown by the arrows in Figure 4 adjacent to and between the baffle plates 87 and 88. The balance of the areodynamic forces in flight is assured by means of the flexible joint 73 which has the form of a gutter, which is fixed respectively at the posterior edge of the lower part of the wing and to the interior edge of the bottom side of the flap.

In Figure 5 the flap is turned down to produce the greatest lift for low speed flight. The relative depth in percentages of the chord of the airfoil is preferably limited in range to between 10 and 30 percent. The operator, desiring to tilt flap 66' downwardly from the position indicated in Figure 4, pulls upon cable 77 to lift it, whereby piece 76 is lifted, thereby swinging the tapering end of flap 66' downwardly about the pivot 75, and causing its main or major body portion to incline downwardly as shown in Figure 5. This has the effect to completely open the mouth of the air slot 91 so a greater volume of air will be sucked into the wing to sustain it in lifting power, especially when the speed of flight has slackened. The low pressure found in the interior of the wing at 68, formed by the interior of the wing is the reason for the form taken by the flexible joint. It is clear that in the turned-down position the section of passage offered to the inrushing air is increased as much as is deemed necessary by means of the appropriate choice of the form and position of the members described, and particularly of the curve 81 and the form and position of the guide surface 87. When the operator desires to close or raise the flap he pulls the cable 83 upwardly and now, since the point of attachment of this cable to the front wall of the flap is on the other side of its pivot 75 to that where cable 77 is attached, the upward pull on cable 83 results in lifting the flap 66'.

From the foregoing it will be seen that various changes and modifications may be resorted to in practice without affecting the novelty and principle of my invention. These and other modifications are intended to be claimed in the appendant claims.

What I desire to claim and secure by Letters Patent is:

1. In aircraft, in combination, a fuselage and wing associated therewith, a sheath straddling the trailing edge of the wing at its point of juncture with the fuselage in such a way as to encase this portion of the wing and provide air channels at the upper and lower surfaces thereof, said sheath having one edge, above the encased wing extending longitudinally of the wing to define the mouth of one channel, and having another edge opening laterally into the interior of the fuselage to discharge the air received by it from said air channels, and means carried by said fuselage creating a forced draft of air for sucking the air into the fuselage and serving to expel the air from the rear end of the fuselage.

2. In an aircraft, in combination with a fuselage and a wing associated therewith, a sheath straddling the trailing edge of said wing adjacent its juncture with the fuselage and in spaced relation to the upper and lower surfaces of said wing, said sheath cooperating with the wing surfaces to direct currents of air flowing along said surfaces into the interior of the fuselage, and means within said fuselage for accelerating the flow of air through said sheath and thereby reducing the drag of the boundary layer of air adjacent the juncture of the wing with the fuselage.

3. In an aircraft, in combination with a fuselage and a wing thereof, a triangular sheath-like member extending from the side of the fuselage adjacent the base of the wing outwardly along and embracing the trailing edge thereof, said sheath cooperating with the wing surfaces to direct currents of air flowing along said surfaces into the interior of the fuselage, and means within said fuselage for accelerating the flow of air through said sheath and expelling the same rearwardly from the interior of the fuselage.

PIERRE ERNEST MERCIER.

REFERENCES CITED

The following references are of record in the file of this patent:

UNITED STATES PATENTS

| Number | Name | Date |
| --- | --- | --- |
| 1,874,278 | Gaines | Aug. 30, 1932 |
| 1,922,167 | Leray | Aug. 15, 1933 |
| 1,972,190 | Gregg | Sept. 4, 1934 |
| 2,008,424 | Stalker | July 16, 1935 |
| 2,041,792 | Stalker | May 26, 1936 |
| 2,041,794 | Stalker | May 26, 1936 |
| 2,049,573 | Stalker | Aug. 4, 1936 |
| 2,104,144 | Zand | Jan. 4, 1938 |
| 2,176,809 | Zap | Oct. 17, 1939 |
| 2,272,664 | Gropler | Feb. 10, 1942 |
| 2,274,442 | Woods | Feb. 24, 1942 |
| 2,277,173 | Wagner et al. | Mar. 24, 1942 |

FOREIGN PATENTS

| Number | Country | Date |
| --- | --- | --- |
| 107,574 | Great Britain | Nov. 8, 1917 |
| 272,661 | Great Gritain | June 28, 1927 |
| 390,363 | Great Britain | Apr. 6, 1933 |
| 406,713 | Great Britain | Feb. 28, 1934 |
| 512,064 | Great Britain | Aug. 29, 1939 |
| 542,653 | Great Britain | Jan. 21, 1942 |
| 679,023 | Germany | July 29, 1939 |